United States Patent [19]
Spooner

[11] 3,906,823
[45] Sept. 23, 1975

[54] APPARATUS FOR STACKING AND WEIGHING SLICED FOOD PRODUCTS

[75] Inventor: Robert J. Spooner, Essex, Conn.

[73] Assignee: Cashin Systems Corporation, Williston Park, N.Y.

[22] Filed: Apr. 3, 1974

[21] Appl. No.: 457,480

Related U.S. Application Data

[62] Division of Ser. No. 282,651, Aug. 22, 1972, Pat. No. 3,835,742.

[52] U.S. Cl. .................................. 83/73; 83/77
[51] Int. Cl.² ................... B26D 4/46; G01G 13/22
[58] Field of Search ................ 83/73, 77, 91, 92

[56] References Cited
UNITED STATES PATENTS

| | | | |
|---|---|---|---|
| 2,812,792 | 11/1957 | Allbright | 83/77 |
| 3,200,864 | 8/1965 | Gillman | 83/77 |
| 3,204,676 | 9/1965 | Gillman | 83/73 |
| 3,605,837 | 9/1971 | Lambert et al. | 83/73 |

*Primary Examiner*—Willie G. Abercrombie
*Attorney, Agent, or Firm*—Kane, Dalsimer, Kane, Sullivan and Kurucz

[57] ABSTRACT

Apparatus is provided for stacking and weighing slices of cold cuts coming from the discharge end of a slicing machine. The apparatus is initially set to receive slices in stack form on a stacker. A scale is operatively connected to the stacker to register the weight after a preselected amount of slices are collected on the stacker. In one embodiment the scale actuates the stacker to transfer the stack of slices when it attains the desired weight. The scale in another embodiment serves to feed back appropriate signals to the feeding mechanism of the slicing machine to adjust sliced thickness to compensate for over or under weight slices or stacks registered by the scale. In this embodiment a preset count of slices are stacked before the weight is registered. The scale may also serve to actuate a reject mechanism for isolating those stacks not within the prescribed weight tolerances.

4 Claims, 5 Drawing Figures

APPARATUS FOR STACKING AND WEIGHING SLICED FOOD PRODUCTS

This is a division of application Ser. No. 282,651, filed Aug. 22, 1972 now U.S. Pat. No. 3,835,742 issued Sept. 17, 1974.

BACKGROUND OF THE INVENTION

The present invention relates to improvements in apparatus for slicing food products and arranging them in stack form of controlled weight; apparatus of this type is disclosed in commonly assigned U.S. Pat. Nos. 3,099,304, granted July 30, 1963, 3,200,864, granted Aug. 17, 1965, and 3,204,676 granted Sept. 7, 1965. While apparatus of the type disclosed in these patents has proven to be eminently satisfactory, it is desirable to upgrade their operation and efficiency in an effort to further reduce giveaway weights of product being sliced and the time of attendant personnel required to make proper weights of those stacks not within the prescribed weight tolerances.

SUMMARY OF THE INVENTION

Accordingly, it is a principle object of the present invention to provide an improved apparatus for stacking and weighing slices of food product that is highly efficient with reduced giveaway weights and labor costs.

Another object is to measure the weight of slices being stacked closer to the slicing blade in order that slice thickness adjustments may be made as quickly as possible for earlier stack weight corrections.

Other objects and advantages will become apparent from the following detailed description which is to be taken in conjunction with the accompanying drawings.

DETAILED DESCRIPTION

Figure 1:
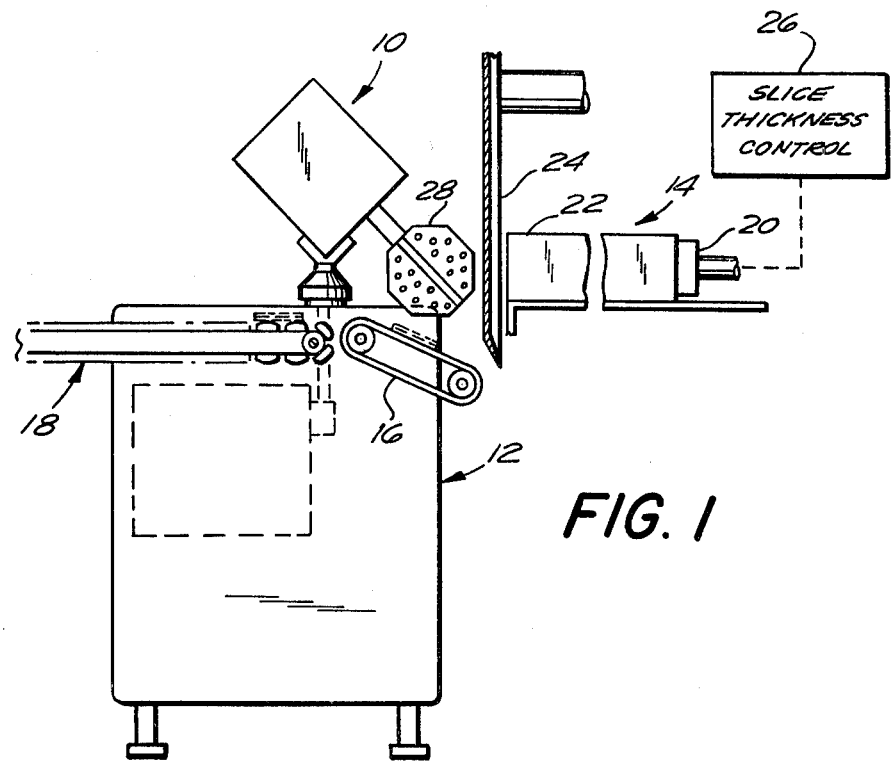
FIG. 1 is a fragmentary side-elevational view of the apparatus of the present invention for stacking and weighing sliced food products coming from a slicing machine and transferring the stacks of desired weight to a packaging station.
Figure 2:
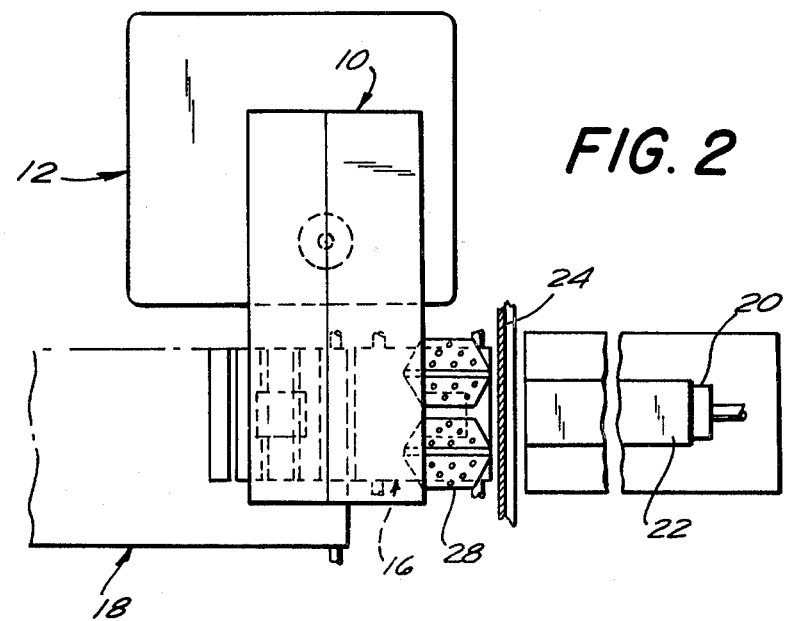
FIG. 2 is a top plan view thereof.

In the drawings, a stacker 10 is supported by scale 12 shown at the discharge end of a slicing machine 14. The sliced product discharged on the stacker 10 is deposited as a stack on the conveyor 16 and then eventually to a packaging station (not shown). In accordance with one of the embodiments of the present invention, if a stack registered by the scale 12 is not within the prescribed weight tolerances, it is rejected by reject conveyor 18 and transferred to a station at which the proper weight is manually made.

The slicing machine 14 may be any one of the several different types of slicing machines presently being used in the meat packing industry. In accordance with a successful embodiment of the invention, the slicing machine 14 may be of the type disclosed in the above referenced patents and which is available commercially under the name Anco, Number 832, Cold Cut Slicer, manufactured by the Allbright-Nell Co. of Chicago, Illinois. In a slicing machine of this type, a feeder 20 shifts forwardly thereby pushing the loaf 22 of the selected cold cut into the slicing blade 24. A sliced thickness control 26 is coupled with the feeder 20 to increase or decrease the rate of travel of the feeder 20 and consequently increase and decrease the slice thickness, respectively. As will be described shortly, the control 26 may be automatically adjusted in response to feedback signal from the scale 12.

In accordance with several embodiments of the present invention, the stacker 10 is driven in timed relationship with the rotation of the shaft of the blade 24 and receives slices of the product 22, collects them in a stack on paddles 28, and after the blade has cut the last slice, deposits the stack on the conveyor 16. As disclosed in the above referenced U.S. Pat. No. 3,204,676, the stacker 10 may be obtained commercially under the name Anco, Number 834, Slice-Stacker, manufactured by the Allbright-Nell Co. of Chicago, Illinois. As explained below, the stacker 10 could be actuated by scale 12.

The stacker 10 is mounted on and supported by a scale 12 in order that the stack weight on the stacker paddles 28 will be transferred to the scale. This scale may be of the type disclosed in the above referenced patents. Although any one of a number of commercially available scales may be employed, a scale particularly applicable to the present invention may be obtained commercially from the manufacturer, Wright Machinery Co., a division of Sperry-Rand Corporation of Durham, North Carolina under the name of Wrightronic Checkweigher.

The conveyor 16 is conveniently located to receive the stacks of sliced products that are deposited upon the actuation of the stacker 10. The conveyor 16 is constantly driven by a motor (not shown) which may be of the type disclosed in the above referenced U.S. Pat. No. 3,200,864, which travels at a low speed during the depositing of the sliced stack thereon by the stacker 10 and at an increased speed in order to remove the stacks therefrom in a minimum period of time.

The conveyor 18 will receive the stacks from the conveyor 16 and transfer them to the packaging station (not shown). In the event conveyor 18 is of the stack rejecting type which is actuated upon receipt of signals from the scale 12 when a stack weight is registered outside of the prescribed tolerances, a reject conveyor of the type disclosed in the above referenced U.S. Pat. No. 3,200,864 may be employed. This type of conveyor operates to divert an overweight or underweight stack in order that the proper weight may be made.

Figure 3:
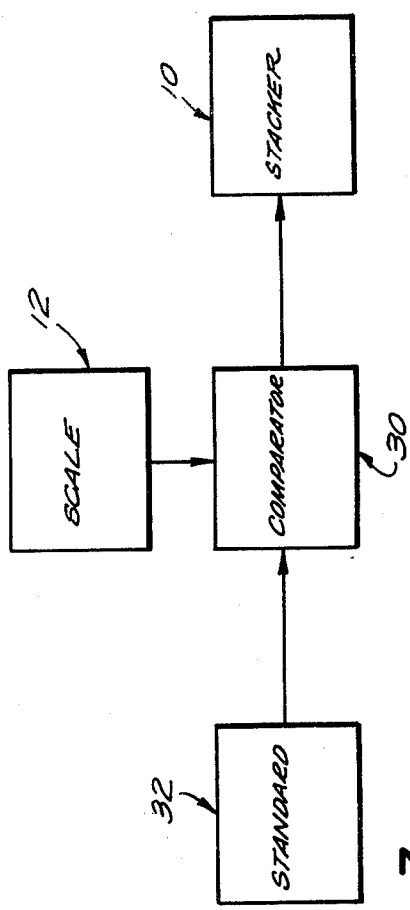
FIG. 3 is a block diagram of the apparatus of FIGS. 1 and 2 with the stacker being actuated when a predetermined weight is registered by the scale.

Referring now to FIG. 3, the scale 12 is adapted to actuate the stacker 10 when the preset weight is registered for the stack of slices being accumulated on the blades 28. In other words, the slice thickness control 26 will be initially adjusted for the desired slice thickness, and the ultimately formed stack of slices having this weight will be formed independently of any slice count. In order to insure against slivers and provide for full slices, the operation of the stacker 10 may be interconnected with the rotation of the blade 24 whereby the stacker is actuated only when the last slice of prescribed thickness has been fully formed. The weight of the stack being formed is sensed by the scale 12 which sends corresponding electrical signals to a comparator 30 which in turn may be any well-known comparator circuitry. Towards this end, the comparator 30 is preset or adjusted by a signal established by the standard 32 corresponding to the desired selected weight of the stack of slices to be formed. When the comparator receives a signal from the scale 12 corresponding to that established by the standard 32, the comparator 30 will operate to actuate the stacker 10. Representative circuitry and means for the comparator and standard are disclosed in the above referenced U.S. Pat. Nos. 3,200,864 and 3,204,676 in connection with the slice thickness control. Thus, stacks are formed by the system of FIG. 3 within the prescribed weight tolerance.

Of course, the stacker 10 may be actuated after a predetermined count in the manner disclosed in the above referenced U.S. Pat. No. 3,204,676. Accordingly, an operative interconnection is provided between the scale 12 which supports the stacker and the slice thickness control 26. In this manner, the speed of the feed of the loaf 22 into the slicing blade 24 by the feeder 20 is automatically regulated to change slice thickness and thereby maintain the weight of the stacked slices within desired limits. As disclosed in that patent, a counter cooperates in determining the number of slices to be collected on and deposited by the stacker paddles 28. This counter is actuated in timed relationship with respect to the rotation of the slicer blade shaft and, in turn, applies its output through a flexible drive shaft to the stacker 10. The count at which the stacker 10 is actuated to shift the paddles 28 is adjustable. Today, it is common to utilize an eight slice stack for one-half pound cold cut packages and a sixteen slice stack for a one pound package.

Figure 4:
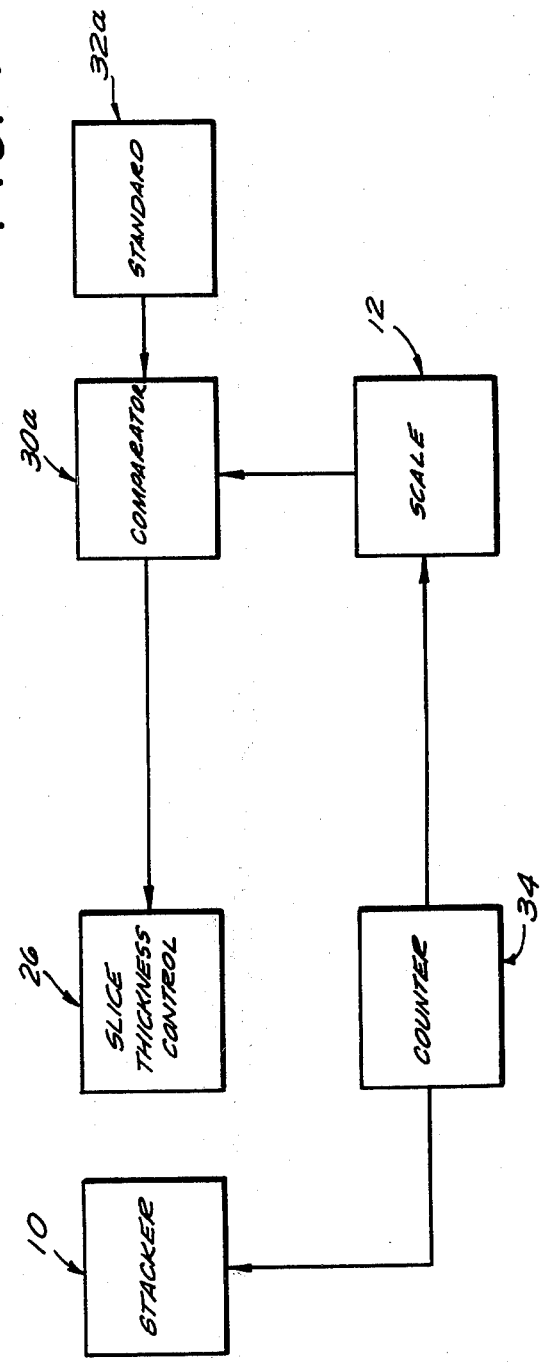
FIG. 4 is a block diagram of the apparatus of FIGS. 1 and 2 with the scale registering the weight of the stack of slices after a predetermined count, less than that to be contained in the ultimate stack, in order that the remaining slices may have adjusted thicknesses to bring the stack within the prescribed weight tolerances, at the time the stacker is actuated.

In FIG. 4 a similar system is illustrated, but instead of adjusting slice thickness after weighing the entire stack of slices, the scale 10 weighs the stack after a prescribed count less than the number of the slices to contained in the ultimately formed stack. For example, the scale may register the weight at $n-3$, $n$ being the number of slices to be contained in the ultimately formed stack. The count is taken from the slicing blade shaft by counter 34 which operates to actuate the stacker 10 in a manner similar to that disclosed in the above referenced U.S. Pat. No. 3,204,676. Thus, the stacker 10 receives slices from the discharge end of the slicing machine 14. At $n-3$ slices, the scale 12 registers weight and transmits this weight signal to comparator 30a which compares this signal with the preset standard 32a for the proper weight of $n-3$ slices. If this weight is outside of the preset tolerance, then the speed of feed of the feeder 20 is correspondingly changed through the adjustment of the slice thickness control 26. Under these circumstances, the last three slices of the stack being formed will have introduced a thickness adjustment which will bring the stack within the proper weight. Of course, when the prescribed count indicating the desired number of slices in the ultimately formed stack has been reached, the counter 34 actuates the stacker 10 to permit this stack of proper weight to be transferred to the packaging station.

Figure 5:
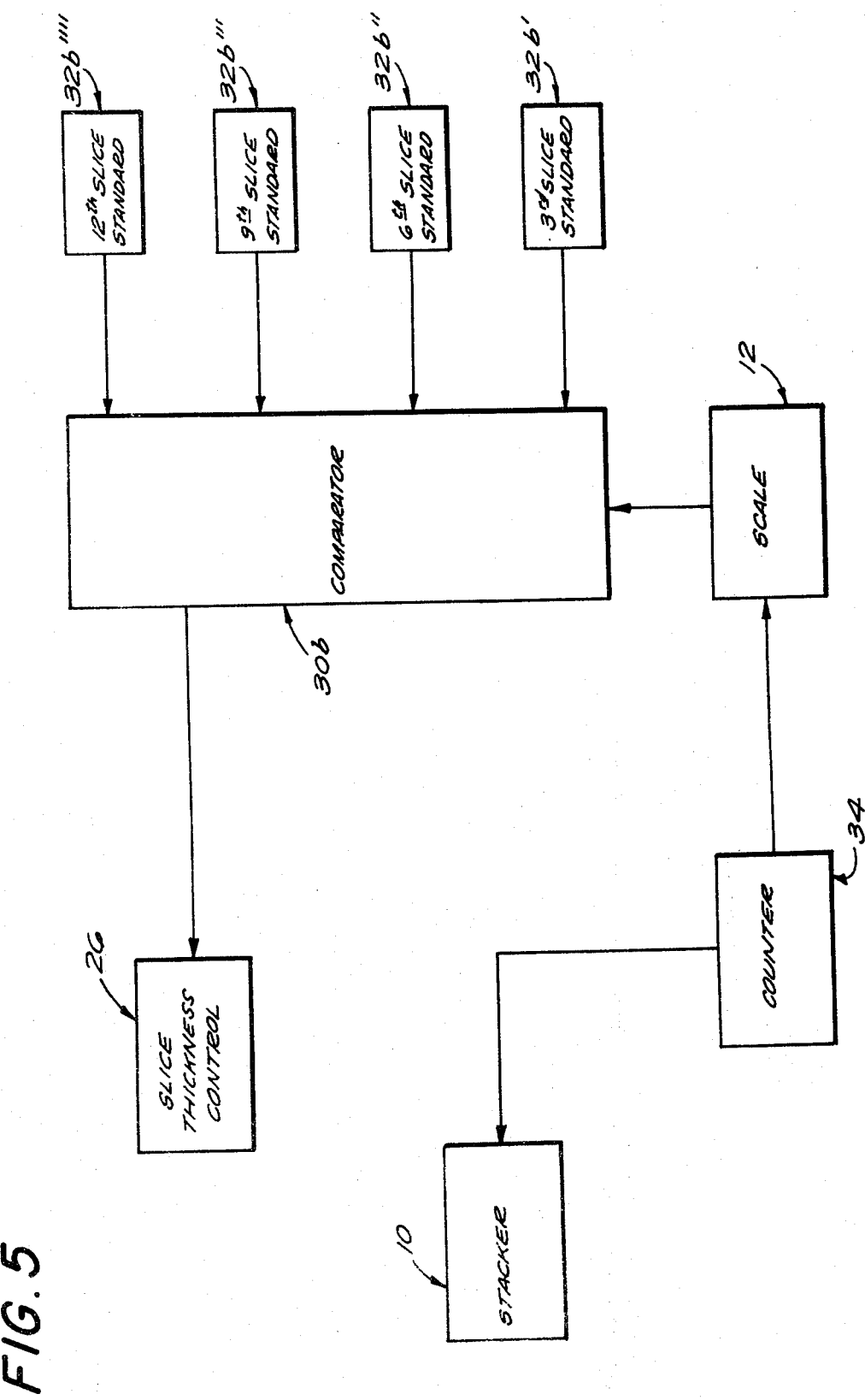
FIG. 5 is a block diagram of such apparatus with the scale sensing at intervals the stack weight after a predetermined number of slices have been deposited on the stacker for adjusting slice thickness between these intervals in order that the ultimate stack will be within the prescribed weight tolerance when the stacker is actuated.

In the embodiment of FIG. 5 and assuming it is desired to form a 16 slice, 1 pound package, the stack weight is sensed by the scale 12 at the end of every three slices being deposited in stack form on the stacker 10. Accordingly, after three slices have been deposited on the stacker 10 after the initiation of the formation of a new stack, the weight registered by scale 12 is compared by the comparator 30b with the standard weight for three slices of the product being sliced as established by the three slice standard 32b. If the actual weight of the three slices does not fall within the tolerance established by the three slice standard 32b, a signal is sent to the sliced thickness control 26 to adjust the rate of feed of the feeder 20 to thereby alter the slice thickness by a proportionate amount in order that the remaining slices of the stack being formed may have an adjusted or corrected thickness. The same sequence is repeated at six slice, nine slice, and twelve slice intervals. In accordance with standard practice when the selected stack count is taken from the slicer blade shaft by the counter 34, the stacker 10 is actuated in order that this stack may be transferred to the packaging station. Where desired or necessary, the scale may sense the weight of slices accumulated on the stacker 10 at more frequent intervals.

In the embodiments of FIGS. 4 and 5, the scale may also register or sense the weight of the stack having the ultimate and desired number of slices. Should, for any reason, this stack not be within the prescribed weight tolerance, a reject mechanism may divert this stack in a manner disclosed in the above referenced U.S. Pat. No. 3,200,864. An attendant or operator will then bring this stack within the limits of proper weight.

Thus, the several aforenoted objects and advantages are most effectively attained. Although several somewhat preferred embodiments of the invention have been disclosed and described in detail herein, it should be understood that this invention is in no sense limited thereby and its scope is to be determined by that of the appended claims.

I claim:

1. In combination a slicing machine having a slicing blade, a feeding means for feeding the product to be sliced into said blade and control means for determining the rate of advance of said feeding means towards said blade, and consequently, the sliced thickness; apparatus for stacking slices of said product as they are discharged by said slicing machine and then transferring the stacks of sliced product, said apparatus comprising in combination a paddle stacker to be located adjacent to the discharge end of said slicing machine for receiving the slices discharged therefrom, said stacker comprising a pair of mating paddles connected to means for driving each paddle in synchronized opposite directions; weighing means operatively supporting said stacker such that it is adapted to register the weight of the sliced product being stacked thereon; stacker actuating means coupled with said stacker for actuating said driving means to rotate said paddles in opposite directions to transfer the stack of slices of said product and ready said stacker for reception of another stack of slices; slice counting means for determining a preselected number of slices discharged from the slicing machine for stacking on the stacker; said stacker actuating means being coupled with said slice counting means for actuating said stacker driving means to transfer the stack of preselected number of slices of said product; stack receiving means and conveying means in stack receiving position adjacent said stacker, and being adapted to receive thereon the stacks of sliced product transferred by said stacker.

2. The invention in accordance with claim 1 wherein feedback coupling means couples said weighing means and said control means of said slicing machine for adjusting the rate of advance of said feeding means and consequently the slice thickness corresponding to the weight of the individual stacks over and below said prescribed weight for the preselected number of slices to respectively decrease and increase the rate of advance of said feeding means and consequently decrease and increase the slice thickness.

3. The invention in accordance with claim 2 wherein reject means are coupled with said weighing means for rejecting stacks of sliced product that are underweight and not within the prescribed weight limits.

4. The invention in accordance with claim 2 wherein the slice counting means permits the weighing means to register the weight of a certain number of slices less than the preselected number of slices for forming the entire stack of slices; comparator means for comparing the weight of said certain number of slices with that of a standard for said certain number of slices, said feedback coupling means being operable to adjust the control means and consequently the rate of advance of said feeding means to thereby adjust slice thickness of the remaining slices of the preselected number of slices constituting the entire stack to be accumulated on the stacker.

* * * * *